May 25, 1937.  J. G. TOMPKINS  2,081,468
HOSE SUPPORTER
Filed Oct. 26, 1934
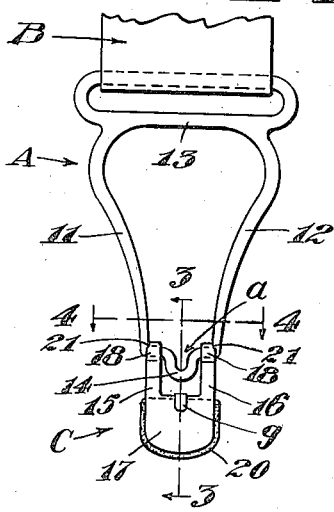
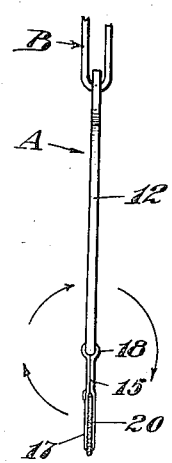
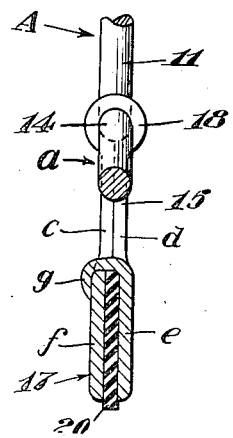
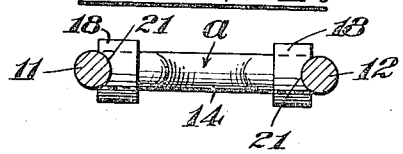
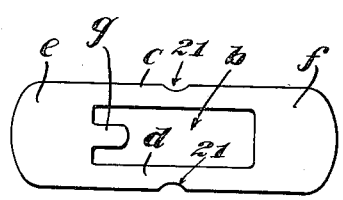
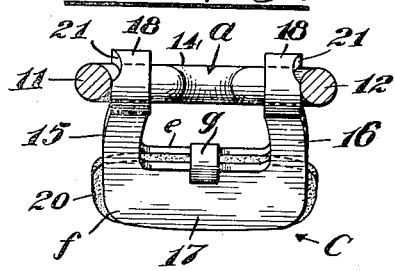
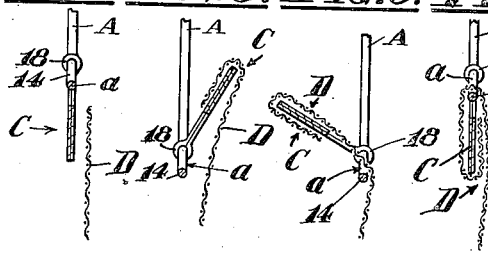
Inventor.
James G. Tompkins.
By
R. S. Berry
Att'y.

Patented May 25, 1937

2,081,468

UNITED STATES PATENT OFFICE 2,081,468

HOSE SUPPORTER

James G. Tompkins, Los Angeles, Calif.

Application October 26, 1934, Serial No. 750,158

8 Claims. (Cl. 24—243)

This invention relates to a hose supporter, and more particularly pertains to the type of hose supporter embodying a pivotally mounted fastening member arranged to be swung vertically and turned in either a complete or partial revolution around its axis on a supporting member in such manner as to effect wrapping of a portion of a piece of fabric of a hose therearound; the invention more especially pertaining to improvements in the construction of hose supports of the class set forth in reissued patent numbered 19,930 of April 14, 1936, and in my co-pending applications for United States Letters Patent Serial Numbers 693,603; 693,605; and also Serial Numbers 750,157 and 750,159, filed co-incidentally herewith, and also to supports of the class set forth in United States Letters Patent Number 1,868,644 issued to me July 26, 1932 and to United States Letters Patent Number 926,916 issued to Daniel Wertz, July 6, 1909.

An object of the invention is to provide a construction whereby the fastening member may be normally disposed in a dependent position relative to its support and be releasably held in such position so as to facilitate initial positioning of the fastening member for engagement with the fabric of a hose and also resist movement of the fastening member relative to its support while the hose is engaged thereby.

Another object of the invention is to provide a construction whereby when the fastening member is operated to effect wrapping of the fabric therearound a portion of the fabric will be engaged by the fastening member and another portion will be engaged by the supporting member whereby the portion of the hose extending downwardly from the supporter will be carried directly on the supporting member.

With the foregoing objects in view, together with such other objects and advantages as may subsequently appear the invention resides in the parts and in the combination, construction and arrangement of parts hereinafter described and claimed and illustrated by way of example in the accompanying drawing in which:

Fig. 1 is a view of the hose supporter as seen in front elevation showing the parts as disposed in their normal position:

Fig. 2 is a view of the supporter as seen in edge elevation:

Fig. 3 is a view in vertical section taken on the line 3—3 of Fig. 1; as seen in the direction indicated by the arrows:

Fig. 4 is a detail in horizontal section taken on the line 4—4 of Fig. 1:

Fig. 5 is a view in section similar to that shown in Fig. 4 showing the fastening member as disposed out of its normal depending position:

Fig. 6 is a plan view of a sheet metal blank employed in forming the fastening member;

Figs. 7, 8, 9, and 10 are diagrams in vertical section depicting the operation of the invention.

Referring to the drawing more specifically, A indicates generally a supporting member which is in the form of an elongated loop having inwardly curved side members 11 and 12, an upper end member 13, and a lower end member 14. The supporting member A is designed to be secured to and carried by a member B of a band, belt, garter, girdle, corset and the like.

Pivotally carried on the lower end of the supporting member is a fastening member C which is designed to be rotated around its axis, and passed between the side members 11 and 12 of the supporting member A; the side members being spaced apart a sufficient distance and having sufficient length to form a gap therebetween through which the fastening member C may pass.

In carrying out the present invention the lower end member 14 of the supporting member A is bent downwardly intermediate its ends into substantially U-shape to provide a recess $a$ in the upper margin thereof.

The fastening member C is in the form of a yoke having side members 15 and 16 connected together at one end by a plate member 17 and having their free ends formed with sleeves 18 which encircle the end members 14 of the support A in pivotal or hinged engagement therewith.

In forming the supporting member C a sheet metal blank is provided as shown in Fig. 6 which is so shaped that when bent upon itself intermediate its ends a yoke will be formed consisting of side members, an end member, and sleeves on the ends of the side members; the blank comprising an elongated strip of sheet metal formed with an elongated rectangular slot $b$ extending longitudinally of the strip centrally thereof forming side members $c$ and $d$ and end members $e$ and $f$.

A tongue $g$ is formed on the end member $e$ and when the strip is bent upon itself intermediate its ends the tongue is bent to engage the other end member $f$ as shown in Figs. 3 and 5.

As a means for forming the fastening member C with a cushion or friction grip, a strip or sheet of resilient material 20 is interposed between the end members $e$ and $f$ when the latter are folded to overlie each other, the margins of which resilient strip protrude slightly from the end of the member 17 and along the side margins thereof thus forming the fastening member C with a yieldable lip adapted to frictionally engage fabric wound therearound.

In assembling the fastening member C on its supporting member A, the blank shown in Fig. 6 is bent around the end member 14 of the support to form the sleeves 18 which encircle the end member 14 between the ends of the U-bends thereof and the lower ends of the side members 11 and 12; the side members c and d of the slot b being bent intermediate their ends to form the sleeves 18 and having portions thereof overlying each other to form the side members 15 and 16 of the yoke and with the end members e and f overlying the resilient sheet 20 to form the end plate 17 of the fastening member, as particularly shown in Fig. 3.

As a means for temporarily locking the fastening member C in its dependent position relative to the support A and to yieldably oppose its being swung out of such position, the outer upper marginal portions of the sleeves 18 are formed with arcuate notches 21 arranged to engage the inner marginal portions of the side members 11 and 12 when the fastening member is in its dependent position as particularly shown in Fig. 4.

The side members 15 and 16 are inherently resilient and are accordingly adapted to be sprung so that on swinging the fastening member C out of its depending position the notches 21 will ride out of engagement with the side members 11 and 12 under the yieldable resistance afforded by the side members 15 and 16.

In the application and operation of the invention the fastening member C is disposed in its normal dependent position with the notches 21 on the sleeves 18 thereof engaging in the lower portions of the side members 11 and 12 of the supporting member as particularly shown in Figs. 1 and 2, whereupon the fastening member is positioned alongside the upper portion D of the hose or fabric to be engaged thereby as shown in Fig. 7.

The fastening member is then swung upwardly with a portion of the fabric astride thereof as shown in Fig. 8. The fastening member is then advanced through the supporting member as shown in Fig. 9 and then brought downwardly to its initial depending position as shown in Fig. 10 and disposed with the notches 21 engaging the lower portions of the members 11 and 12.

A portion of the fabric will be looped over the lower end of the depending fastening member C while another portion thereof will be extended between the side members 11 and 12 of the support A and will extend downwardly into the recess a and seat on the end member 14 of the support. Another portion of the fabric will overlie the end portion D of the fabric engaged by the fastening member so that on the hanging portion of the fabric being pulled downwardly, or the supporting member being pulled upwardly, the portion of the fabric extending alongside the fastening member and overlying the marginal portion of the fabric engaged by the end of the yoke.

When it is desired to detach the fabric from the fastening member the latter is swung upwardly in a direction opposite that initially employed in effecting connection with the fabric and on the fastening member then being swung to the opposite side of the supporting member a pull on the fabric will effect release thereof.

While I have described the invention as applied to supporting of hose it will be understood that it may be used to support other garments.

I claim:

1. In a hose supporter, a support having side members and an end member connecting the lower ends of said side members, said end member being formed with an upwardly opening recess, a fastening member pivoted on said end member at opposite sides of said recess to swing between said side members to wrap a fabric therearound with a portion of the fabric extending between said side members and bearing in the recess on said end member.

2. In a hose supporter, a support having side members and an end member connecting said side members, said end member being formed with a recess, a yoke having its open end pivotally connected to said end member with the recessed portion of the latter extending between the ends of the side members of said yoke, said yoke being adapted to be swung around said end member to wrap a fabric therearound with a portion of the fabric overlying said end member and seating in said recess.

3. In a hose supporter, a support having spaced side members and an end member connecting said side member formed with a recess on its upper edge and a yoke having the outer ends of its side members hingedly connected to said end member on opposite sides of said recess; said yoke being turnable on said end member to pass between the side members of said support.

4. In a hose supporter, a support having spaced side members and an end member connecting said side members, a yoke, and sleeves on the outer ends of the side members of said yoke turnably encircling said end member adjacent the inner side faces of the side members of said support, said yoke being turnable to pass between the side members of said support, the side members of said yoke being resilient, and means for connecting at least one of said sleeves to the adjacent side members of said support to hold said yoke against free swinging movement on said support.

5. In a hose supporter, a support having spaced side members and an end member connecting said side members, a fastening yoke, and sleeves on the outer ends of the side members of said yoke encircling said end member in hinged connection therewith and bearing against the inner faces of said side members, at least one of said sleeves being formed with a notch to engage the adjacent side member of said support; said yoke being swingable between the side members of said support.

6. In a hose supporter, a support having spaced side members and an end member connecting said side members, a fastening yoke, and sleeves on the outer ends of the side members of said yoke encircling said end member in hinged connection therewith and bearing against the inner faces of said side members, at least one of said sleeves being formed with a notch to engage the adjacent side member of said support; said yoke being swingable between the side members of said support, said end member being formed with a recess on its upper margin extending between said sleeves.

7. In a hose supporter, a support having spaced side members and an end member connecting said side members, said end member being formed with a U-bend intermediate its ends, a fastening yoke formed from a sheet metal blank having a central slot, said blank bent intermediate its ends over said end member into pivotal engagement therewith, and means fastening the end portions of said blank together.

8. In a hose supporter, a support having spaced side members and an end member connecting said side members, a fastening yoke formed from a sheet metal blank having a central slot; said blank bent intermediate its ends over said end member into pivotal engagement therewith, and means fastening the end portions of said blank together.

JAMES G. TOMPKINS.